Patented May 5, 1953

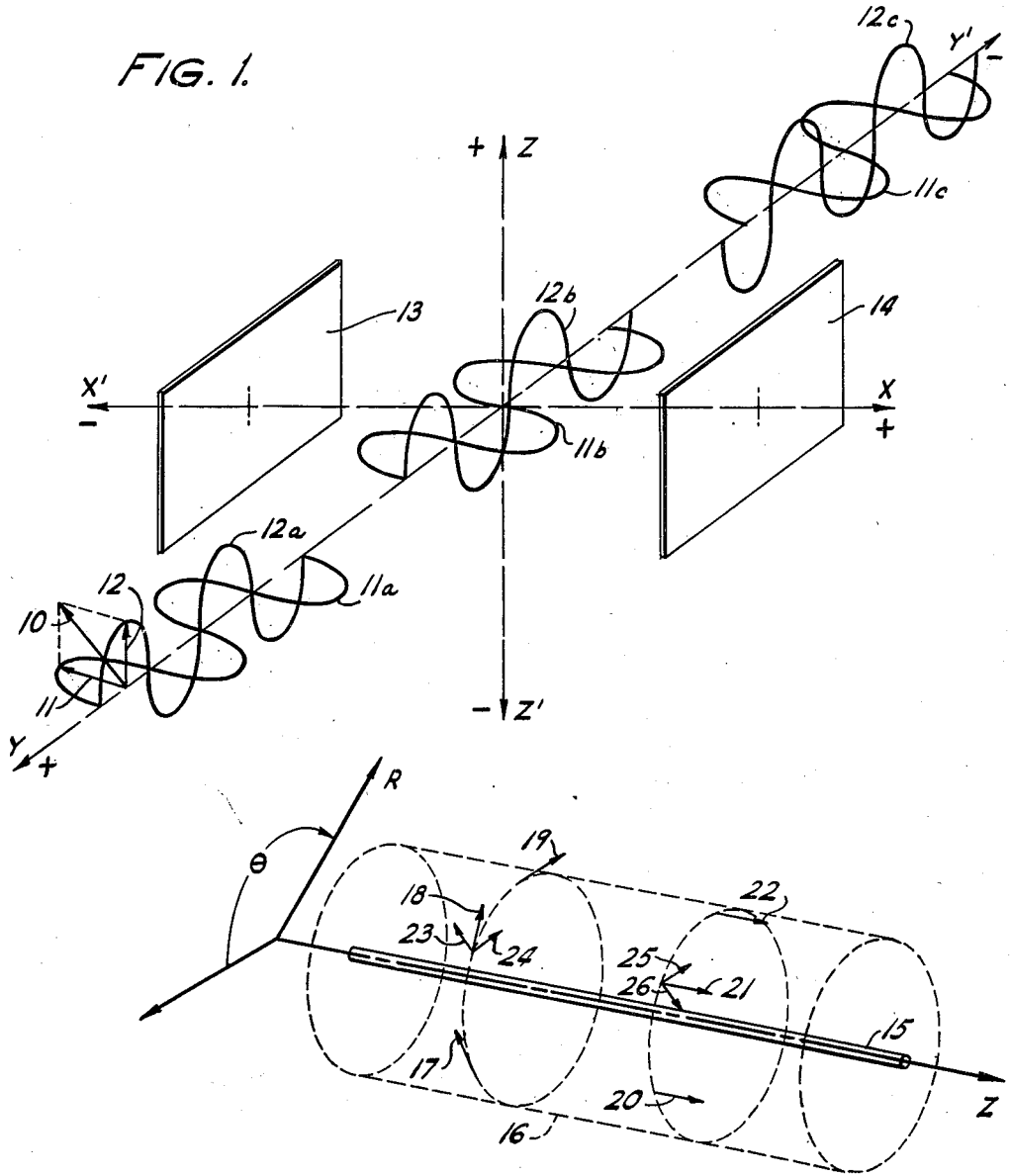

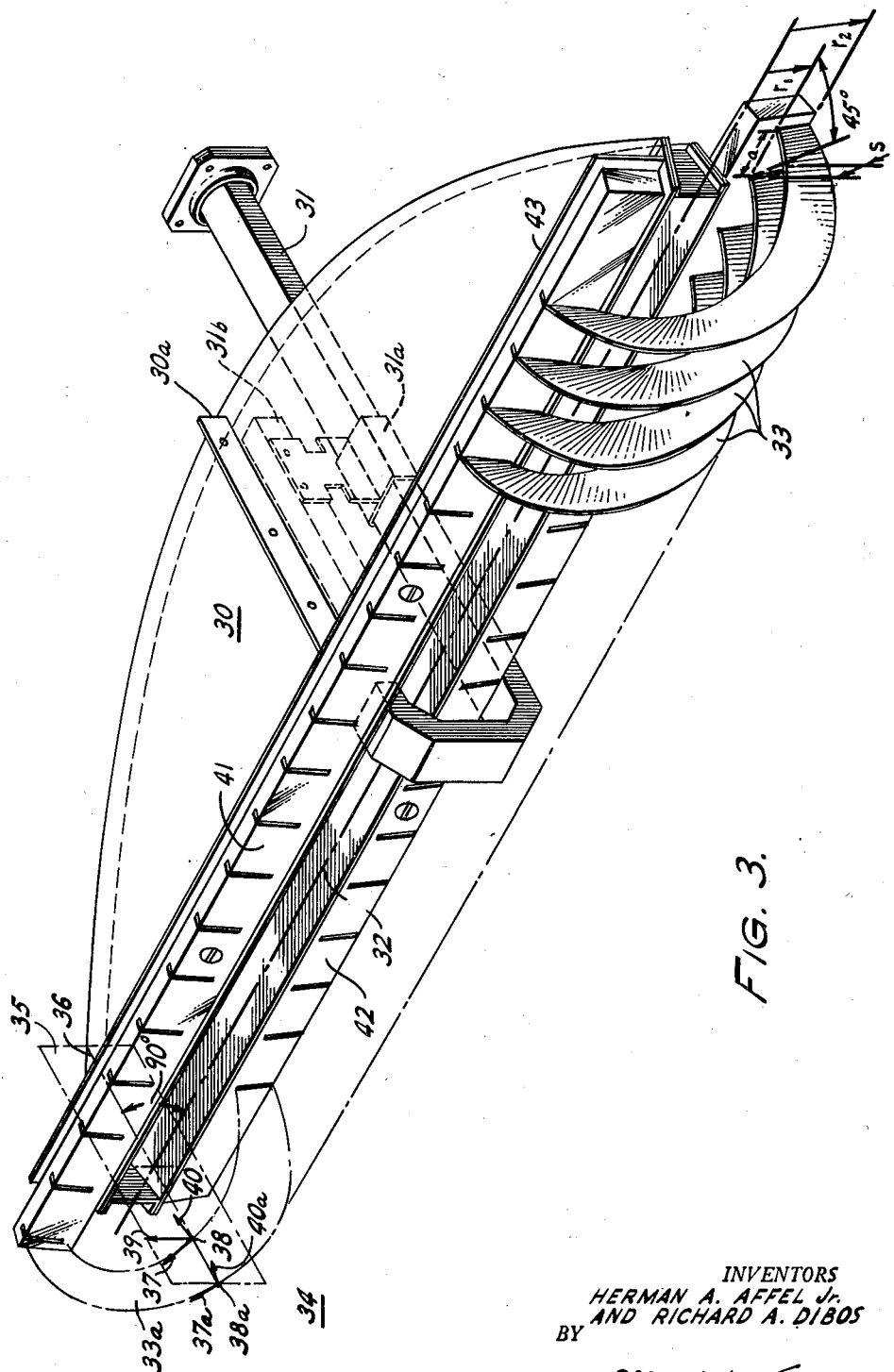

2,637,847

UNITED STATES PATENT OFFICE 2,637,847

POLARIZING ANTENNA FOR CYLINDRICAL WAVES

Herman A. Affel, Jr., Philadelphia, and Richard A. Dibos, Glenside, Pa., assignors to Philco Corporation, Philadelphia, Pa., a corporation of Pennsylvania Application December 4, 1948, Serial No. 63,524

9 Claims. (Cl. 343—100)

The invention herein described and claimed relates to apparatus and means for propagating electromagnetic wave energy. More particularly it relates to apparatus and means for propagating waves having a particular type of wavefront and polarization and to apparatus and means for converting waves having particular types of wavefront and polarization to waves having the same type of wavefront and a different type of polarization.

It is frequently desirable, particularly in the art of object detection and location by the transmission of electromagnetic wave energy and the observation of reflections of such transmitted energy from target objects, to propagate such wave energy so that the propagated waves are either circularly or elliptically polarized. The meanings of these terms are well recognized in the art and, moreover, will be fully discussed hereinafter. For example it has been customary in the past to resort to the use, in radar equipment, of transmitting and receiving antennae which, at a particular instant, are capable of transmitting or receiving waves polarized in a particular direction, the direction of the polarization of the waves which the antennae are capable of transmitting or receiving being caused to vary as a function of time. One of the principal reasons for doing this is to reduce the susceptibility of the equipment to intentional jamming. The waves radiated by such antennae are either circularly or elliptically polarized and the antennae are capable of receiving only wave energy which is polarized, or whose polarization varies, in like manner. In order to be capable of effecting continuous jamming of the receiver in such a system, the jamming signal must not only be of the frequency to which the receiver is tuned, but also its polarization must be caused to vary in the same manner as that of the energy susceptible of reception by the radar equipment. This constitutes an additional condition or requirement which may not be readily met by the would-be jammer, and which will, in any event, necessitate the use of more elaborate and complicated equipment to effect jamming.

On the other hand, the use of a circularly or elliptically polarized jamming signal may also be of advantage to a would-be jammer. This is the case where the antenna of the equipment to be jammed is capable of receiving only waves polarized in a particular direction which is unknown, or waves whose polarization varies in a random or unknown manner. Under such circumstances the use of a circularly or elliptically polarized jamming signal will make it possible to insure jamming of the equipment during at least a portion of each cycle of the jamming signal.

Another significant advantage of circularly or elliptically polarizing the energy radiated by a radar transmitter is that it makes possible the substantial elimination of the deleterious effects of reflections from objects other than those which it is desired to detect, which might otherwise interfere with the clear indication of objects which are of interest. For example, if there are raindrops in the atmosphere through which the transmitted energy is propagated, reflections of the waves from the drops will be picked up by the receiver and, when supplied to an indicator, along with reflections from targets of interest, may so complicate the indication as to make it almost impossible to distinguish the significant targets from the raindrops. This is particularly true when the wavelength of the transmitted energy is exceedingly short—e. g. in the neighborhood of three centimeters or less. This difficulty can be almost completely overcome by using a special form of radiating and receiving antenna, which may comprise, in combination, an antenna which is capable of transmitting and receiving only waves which are polarized in a particular direction, and a structure interposed in the path of radiated and received energy for converting plane or linearly polarized waves to circularly polarized waves, and vice versa. The reason why such a structure is capable of substantially eliminating the effects of the undesired rain echoes will now be explained.

It is well known that if a circularly polarized wave impinges upon a small, almost spherical target, such as a raindrop, the reflected wave will likewise be circularly polarized, but in the sense opposite to that of the impingent wave. Hence, when the reflection arrives at the antenna, it will be converted into a plane polarized wave whose polarization is in the direction perpendicular to that which the antenna is capable of receiving. Because of this, no appreciable amount of the energy comprising the reflection will be received by the antenna. On the other hand, reflections from targets of the sort which it is normally desired to detect will comprise waves circularly polarized in the same sense as the impingent waves which produce them. Upon reaching the antenna these waves will be converted into waves polarized in the direction to which the antenna is responsive, and accordingly will be effectively received. Thus the desired reflections will be available for transmission to the indicator, while the undesired reflections will be substantially excluded.

It is known in the prior art to provide an antenna capable of radiating and receiving circularly or elliptically polarized plane waves. Such an antenna may comprise, for example, a conventional antenna structure capable of radiating and receiving plane or linearly polarized waves, together with means cooperating therewith to convert plane polarized waves radiated by the conventional antenna into circularly or elliptically polarized waves, and also to convert incoming circularly or elliptically polarized waves into plane polarized waves capable of being received by the antenna. The polarization-converting means thus associated with the antenna may comprise a plurality of parallel, spaced, conductive plates interposed in the path of energy radiated from or impingent upon the antenna. If the width and spacing of these plates are appropriately selected for a particular wave-length of the energy to be radiated and received, the structure will operate upon the waves traversing it in substantially the same way that a so-called quarter-wave optical plate operates upon light waves traversing it. It is by reason of the analogy of this effect to the similar effect in optics that the structure just described is sometimes referred to as a "quarter-wave plate." More specifically, if the planes of the plates comprising the structure are disposed at an angle of 45° with reference to the plane of polarization of waves prior to their traversal of the structure, and if the planes of the plates substantially parallel the direction of propagation of the waves, then, if the plates are of a particular width, the plane polarized waves, upon traversing the structure, will be converted to circularly polarized waves. On the other hand if the plates are of the same width but are disposed at an angle other than 0°, 45° or 90°, elliptically polarized waves will be produced.

While, as just indicated, it is known, in the prior art, to provide an antenna structure capable of radiating and receiving only circularly or elliptically polarized plane waves, to the best of our knowledge and belief there has not existed, heretofore, a suitable practical arrangement capable of radiating and receiving circularly or elliptically polarized cylindrical waves. Frequently, however, and particularly in the field of radar, it is desirable to radiate cylindrical waves, and, for the reasons above set forth, it may also be desirable that the waves thus radiated be either circularly or elliptically polarized. It is customary, for example, in certain radar applications, to utilize a fan-shaped beam. Typical antennae for providing a beam of this shape are characterized in that they radiate waves having cylindrical fronts. Moreover, such typical antennae normally radiate waves which are plane polarized. It is apparent, therefore, that the need exists for a practical antenna structure capable of radiating and receiving circularly or elliptically polarized cylindrical waves.

Accordingly it is a primary object of our invention to provide an antenna structure capable of radiating and receiving circularly or elliptically polarized cylindrical electromagnetic waves.

Another object of the invention is to provide simple and practical means for circularly or elliptically polarizing electromagnetic wave energy emanating from a line source.

Another object of the invention is to provide an antenna having a fan-shaped radiation pattern and which is adapted to radiate circularly or elliptically polarized electromagnetic waves.

Yet another object of the invention is to provide a transmitting and receiving antenna structure, suitable for use in radar systems, which is operative to discriminate against reflections from certain undesired target objects.

The manner in which these and other objects are achieved in accordance with the invention will be fully understood from the following discussion of the principles of the invention and description of a representative embodiment thereof, with reference to the drawings, in which:

Fig. 1 is a diagram to which reference will be made in explaining the method, in accordance with the prior art, for converting plane polarized plane waves into circularly or elliptically polarized plane waves;

Fig. 2 is a diagram to which reference will be made in explaining the method, in accordance with the present invention, by which plane or linearly polarized cylindrical waves are converted into circularly or elliptically polarized cylindrical waves; and Fig. 3 is a perspective view of a representative embodiment of the invention.

It is well to note, at this point, that the terms "plane polarized" and "linearly polarized" are both used in the technical literature to denote a wave, the direction of whose electric vector remains fixed as the wave is propagated. The latter term seems to be more accurately descriptive than the former, and appears gradually to be replacing the former. However, the former term appears to be the older and enjoys an accepted meaning. Hence, in the following consideration, the older term "plane polarized" will be used, but it will be understood that the term "linearly polarized" has exactly the same meaning and may be used interchangeably with the term "plane polarized" for the purposes of this specification.

Before proceeding with a detailed discussion of the invention, it will be helpful to consider first the general method, according to the prior art, by which a plane polarized plane wave is converted to a circularly or elliptically polarized plane wave, using the parallel plate apparatus of the prior art hereinbefore mentioned. This consideration will lay the basis for a more ready and complete understanding of the invention.

Referring now to Fig. 1, the figure illustrates the change to which an isolated plane polarized wave is subjected when it passes between two spaced, parallel, conductive plates in a direction parallel to the planes of the plates. For convenience in discussing the change which takes place, it will be assumed that the magnitude of the wave considered varies sinusoidally as a function of time. In the figure there is shown, in perspective, a tridimensional co-ordinate system having orthogonal horizontal axes X—X' and Y—Y', and a vertical axis Z—Z'. Parallel conductive plates 13 and 14 are illustrated. These plates are disposed so that the planes defined by them are parallel to both Y and Z axes and are equally spaced on opposite sides of these axes. The wave to be considered is assumed to be travelling along the Y axis in the negative sense, and to be polarized in a plane forming complementary angles with the X—Y and Y—Z planes respectively. As illustrated the plane of polarization lies at an angle of 45 degrees to each of these planes, but this is not essential to the existence of the phenomenon. The vector 10 represents the magnitude and direction of the E field of the wave at the point in the diagram corresponding to its origin, and will vary in magnitude sinusoidally as a function of time. It is illustrated for a time at which its magnitude is maximum. This vector, and the direction of propagation of the wave along the Y axis, define the plane of polarization of the wave in question. Corresponding vectors might be drawn at other points along the Y axis to represent the magnitudes and directions of the electric field of the wave at those points. All of these vectors would lie in the same plane defined by the vector 10 and the Y axis, and, at any given time, would define an envelope of sinusoidally varying amplitude along the Y axis.

As illustrated in the figure, the vector 10 is resolvable into components 11 and 12 lying respectively in the X—Y and Y—Z planes. These components will be of equal magnitude and each will form an angle of 45° with the vector 10. Similarly other vectors representing the magnitude and direction of the electric field at different points along the Y axis are resolvable into components lying respectively in the X—Y and Y—Z planes and these components respectively, at a particular instant of time, will define envelopes 11a and 12a lying respectively in the X—Y and Y—Z planes.

In the absence of any modifying influence, the wave under consideration will remain polarized in the plane defined by the vector 10 and the Y axis, and the envelopes of the component electric vectors will be in phase, as are the envelopes 11a and 12a in the figure. This condition will exist, for example, prior to the entry of the wave into the space between the parallel conductive plates 13 and 14. However, upon the entry of the wave into the space between the plates, there will be a change in the manner of its propagation. More particularly the plates, while they will have no effect upon the component of the wave perpendicular to the planes of the plates, will produce an increase in the phase velocity of the component which parallels the planes of the plates. The effect of this upon the envelopes defined by the component electric vectors, as the wave passes between the plates 13 and 14, is represented at 11b and 12b, from which it will be noted that the sinusoidal variation of electric field intensity along the Y axis is caused to occur more slowly for the component in the Y—Z plane than for the component in the X—Y plane.

Upon emergence of the wave from the region between plates 13 and 14, it will again begin to be propagated in the same manner as it was prior to its entry into the region—that is, both components of the wave will again be propagated at the same velocity. However, depending upon the length of the path traversed by the wave in the region between the plates, as determined by the widths of the plates in the Y direction, there may exist a difference in phase between the components of the electric vector in the X—Y and Y—Z planes respectively. This difference in phase is evidenced by a difference in phase of the envelopes of the components as represented at 11c and 12c respectively. From this it will be apparent that the resultant electric vectors at different points along the Y axis differ in direction, which, in turn, indicates that the direction of polarization of the wave is changing. If the respective components of the electric vector are 90° out of phase, the wave is circularly polarized, while, if they are out of phase by an angle having a magnitude intermediate 0° and 90°, the wave is elliptically polarized. The amount of phase shift between the two components, and hence the nature of the polarization of the resultant wave can be controlled by varying either one or both of two factors. It can be controlled, as hereinbefore mentioned, by varying the widths of the parallel conductive plates 13 and 14 in the Y direction so as to vary the length of the path traversed by the waves in the space between the plates. Also it can be controlled to some extent by varying the spacing between the plates in the X direction. However, the extent of control which can be achieved in this manner is subject to the limitations that the spacing between the plates must be at least as great as, and preferably substantially greater than, one-half wavelength of the waves dealt with, in order that satisfactory propagation of the waves between the plates may obtain; and to the limitation that, if the propagation of energy in higher modes is to be avoided, the spacing must be kept below a certain maximum. Finally the relative magnitudes of the respective components can be controlled by varying the orientation of the parallel plates with reference to the plane of polarization of the waves prior to their traversal of the region between the plates. This likewise is effective to vary the nature of the polarization of the waves after their traversal of the region. However, it is to be noted that, unless the plates are oriented at an angle of 45° with reference to the initial plane of polarization of the waves, it will be impossible to effect conversion to circularly polarized waves, regardless of how the widths of the plates or their spacing may be varied.

While the operation of a pair of parallel plates in effecting a change from plane to circular or elliptical polarization has been considered with reference to a single, isolated wave, it will be understood that the arrangement is capable of operation in like manner to alter simultaneously the polarization of a plurality of waves comprising a beam of sufficiently small cross section to pass between the plates. Moreover, if the beam is so wide that it cannot be passed between a single pair of plates, a plurality of equally spaced parallel plates, extending over a region sufficient to accommodate the entire beam, may be used and will operate in substantially the same fashion as the pair of plates.

Turning now to the particular problem to which the present invention relates—namely the conversion of plane polarized cylindrical waves to circularly or elliptically polarized cylindrical waves—specific reference is made to Fig. 2 of the drawings. There is illustrated in perspective, with reference to a cylindrical coordinate system employing conventional R, Z and θ coordinates, the mode of propagation of waves from a so-called line source. The line source 15 is disposed along a portion of the Z axis, as shown, and, at each point throughout its length, is capable of radiating waves in every θ direction. The waves thus radiated define a substantially circular cylindrical wavefront whose locus, at some particular instant of time, is the surface of the cylinder 16 whose axis is the Z axis of the coordinate system.

Depending upon the type of line source employed and the manner in which it is excited, the waves emanating from the line source may be polarized either in planes perpendicular to the axis of the line source, in planes passing through the axis of the source and parallel to the direction of propagation of the waves, or partially in both. In the first instance the electric vectors at the wavefront will be perpendicular to the Z axis and tangent to the cylindrical locus of the wavefront, as represented, for example, by the typical vectors 17, 18 and 19. In the second instance, however, the electric vectors will coincide with longitudinal elements of the cylindrical locus, as represented by the typical vectors 20, 21 and 22.

As in the case of the plane polarized plane waves discussed with reference to the diagram of Fig. 1, the electric vectors for each wave emanating from the line source can be resolved into a pair of mutually perpendicular components of equal magnitude, each pair of components lying in a plane tangent to the wavefront, and each component of each pair forming an angle of 45° with the electric vector of which it is a component. In the figure these components are shown for the typical electric vector 18, which is polarized in a plane perpendicular to the axis of the line source 15, and also for the typical vector 21, which is polarized in a plane passing through the axis of the line source. In the former instance the component vectors are designated 23 and 24, while, in the latter instance, they are designated 25 and 26.

It has already been observed, in the consideration of Fig. 1, that, when one of the components of each of the electric vectors is parallel to the planes defined by the parallel conductive plates, and the other component of each vector is perpendicular to such planes, it becomes possible to effect conversion of plane polarized plane waves into circularly polarized plane waves. We have discovered that, in the case of plane polarized cylindrical waves, it is possible to construct a structure, comprising a plurality of specially shaped conductive plates, which satisfies these same conditions with respect to the components of the electric vectors of plane polarized cylindrical waves passing between the plates of the structure. Such a structure, we have found, is capable of converting the plane polarized cylindrical waves into circularly polarized cylindrical waves. The structure is formed of a plurality of spaced, conductive plates, each of which is shaped so as to conform to a portion of the surface of a right helicoid whose axis coincides substantially with the axis of a line source from which the plane polarized cylindrical waves emanate.

For completeness in the present specification, it is appropriate to recite that, as is well known, a right helicoid is a surface generated by a straight line moving so that it constantly touches a helix and its axis, and makes a constant angle of 90° with that axis. (See, e. g., C. H. Schumann, Jr., "Descriptive Geometry," pp. 204 and 205, Van Nostrand, New York, 1927.)

It will be apparent that the cylindrical wavefront of the plane polarized cylindrical waves emanating from a line source whose axis coincides substantially with the axis of a right helicoidal surface will intercept said surface along a helical line whose axis coincides with that of the helicoidal surface. As the wavefront progresses outward from the axis, the radius of this helical line will increase. Hence, while the pitch of the helix thus defined will be the same for different positions of the wavefront, the slope of the helix at any point thereon, measured with reference to a plane passing through said point and normal to the axis of the helix, will decrease for different positions of the wavefront as it progresses outward from the axis. Hence at first it would seem to be impossible, in the case of waves polarized in a predetermined plane, to satisfy the requirements that one of the mutually perpendicular components of each electric vector should remain parallel to the helicoidal surface, and that the other component should remain perpendicular thereto as the waves progress outward. This would appear to be the case since if, for a particular position of the cylindrical wavefront, the pitch of the helicoid is selected so that the desired relationship obtains, then, for a subsequent position of the wavefront, the relationship apparently cannot obtain, with reference to the same helicoid, owing to the decrease in slope of the helix defined by the intersection of the wavefront with helicoid as the wavefront progresses outward. We have found, however, that actually this difficulty does not exist if the helicoidal plates are appropriately designed. Thus, for example, if the extent of the plates be limited to the portion of a helicoidal surface lying between concentric cylinders of different diameters whose axes coincide with the axis of the helicoid, and if the pitch of the helicoid be chosen so that the maximum slope of its surface at any point on the line of intersection of the cylinder of smaller diameter with the helicoidal surface, measured with reference to a plane passing through said point and normal to the axis of the helicoid, is substantially 45°, then, for the electric vectors at every point on said line of intersection, the requirements will be satisfied that one of the components of each of said vectors, such as the component 23 of the typical vector 18 or the component 26 of the typical vector 21, will be parallel to the surface of the helicoid at said point, and the other component of each vector, such as the component 24 of the vector 18 or the component 25 of the vector 21, will be perpendicular to the surface at said point. Despite the fact that, as the wavefront proceeds outward, the slope of the helix defined by its intersection with the helicoidal surface will decrease, apparently this gradual change in the slope of the helicoidal plates operates so as to produce a gradual and corresponding change in the orientation of the electric vectors of the waves as they progress between the plates. This change in orientation is apparently such as to maintain a constant relationship between the orientations of the components of the vectors and the slope of the helicoidal surface, or, as least, any departure from such relationship is so small as not to prevent the structure from functioning in the desired manner in accordance with the principles of the invention as hereinbefore set forth.

Thus it is apparent that the conditions satisfied by the surfaces of the usually shaped plates of the present structure, with respect to the directions of the component electric vectors, are the same as those satisfied by the surfaces of the parallel plates in the structure of Fig. 1 which is used to convert plane polarized plane waves to circularly polarized plane waves. More particularly it will be observed that these conditions are satisfied whether the waves emanating from the line source are polarized in planes perpendicular to the axis of the source, in planes passing through the axis of the source, or partially in each, though it may be here noted that, in general, for a given source, the majority of the waves emanating therefrom will have only one of these types of polarization.

While, in the immediately foregoing discussion, it is specified that the pitch of the helicoids, to which the plates of the structure conform, is made such that the maximum slope at any point on the inner edges thereof, measured with reference to a plane passing through said point and normal to the axis of the helicoid, is substantially forty-five degrees, it will be observed that, as in the case of the structure for converting the polarization of plane waves, this requirement need be satisfied only where it is desired that the resultant waves produced by the operations of the structure shall be circularly polarized. If a conversion to elliptically polarized waves is sufficient, the angle of slope just referred to may have any value between 0° and 90°.

A preferred embodiment of apparatus for producing circularly polarized cylindrical waves, according to the principles just discussed, will now be described with reference to Fig. 3 of the drawings. The apparatus comprises a practical form of line source in combination with a structure comprising a plurality of specially shaped, spaced, conductive plates, as hereinbefore discussed, for converting the plane polarized cylindrical waves, radiated by the line source, into circularly polarized cylindrical waves. As illustrated, the line source comprises a so-called pillbox reflector 30, formed of a pair of parallel metal plates having straight front edges which form an open mouth portion, and closed in the back by a metal strip joining the two plates and forming a parabolic-cylindrical wall. Electromagnetic wave energy is fed to the reflector through a waveguide section 31 whose forward end is bent in the form of a J to direct the energy backward into the reflector. This waveguide section may be supported and held in proper spatial relation to the pillbox reflector by bracket 31a one end of which grasps waveguide 31 while the other end is bolted or otherwise suitably affixed to the L-shaped metal beam 31b which is, in turn welded or otherwise rigidly attached to the outside of reflector 30. The forward end of the waveguide section may be disposed substantially at the focus of the parabolic-cylindrical wall. Energy reflected from the back wall is propagated forwardly between the parallel plates and emerges from the mouth defined by the forward edges of the plates and the end of the parabolic-cylindrical back wall. As illustrated, the mouth of the reflector may be somewhat flared to provide a satisfactory impedance match from the reflector to the space into which the waves are to be propagated. This flare is produced by upward bending of the upper, and downward bending of the lower, of the two parallel plates which form the pillbox reflector, the bending being effected along lines parallel to the axis 32 and slightly backwardly displaced therefrom. The effect of such flaring is well known in the art, and need not be discussed in detail.

An L-shaped metal beam 30a is attached to the outside of reflector 30 by means of which the antenna may be supported and maintained in its proper operating position. The cooperation of the pillbox reflector 30 with the waveguide feed 31 is such that the combination provides, in effect, a line source whose axis 32 coincides substantially with the center of the mouth of the reflector. Energy is radiated perpendicularly from this axis and at substantially all angles to the horizontal within the hemicylinder forward of a vertical plane including the axis 32, to form a fan-shaped beam extending over the hemicylinder and of relatively narrow horizontal width substantially equal to the long dimension of the mouth of reflector 30. Such a beam is particularly adapted to the requirements of airborne search radar apparatus, where a beam narrow in one dimension, and wide in the dimension at right angles to the first dimension, is desirable to provide good azimuthal resolution, while at the same time permitting irradiation, and the reception of reflections from, both nearby and distant targets.

As hereinbefore mentioned the waves emanating from a line source may be polarized either in planes perpendicular to the source axis, in planes which include the source axis, or partially in both. In the present apparatus, the nature of the polarization will be determined by the longitudinal and transverse dimensions of the reflector mouth in relation to the frequency of the energy supplied to the reflector for radiation. In general the longitudinal dimension of the mouth will be sufficiently large so that it will have no appreciable tendency to eliminate either type of polarization. However, for the transverse dimension this may not be the case. If the transverse dimension is less than a wavelength of the wave energy to be radiated, the tendency will be to suppress the propagation of waves whose electric vectors are polarized in directions parallel to the virtual source axis 32, and, as a result, only waves having their electric vectors polarized in planes perpendicular to the source axis will be propagated. On the other hand, if both dimensions of the reflector mouth are in excess of one wavelength of the wave energy, there will be no inherent tendency to suppress waves polarized in either of the two dimensions above mentioned. However, even in this instance there will be a tendency for the radiated energy to be polarized only in one direction, since the energy supplied through the feed waveguide 31 will be polarized in the direction of the narrow dimension of the guide, and, in the absence of discontinuities, there will be no substantial tendency on the part of the reflector to alter this condition.

In one apparatus constructed of the form illustrated in Fig. 3, the longitudinal dimension of the reflector mouth was approximately 31.5 cm., the spacing between the parallel plates forming the reflector was approximately 1.1 cm., and the narrow dimension at the mouth was approximately 3.0 cm. These dimensions are such as to cause the reflector, when supplied with energy at a frequency of 9375 megacycles, to radiate only waves polarized in planes perpendicular to the longitudinal axis of the mouth.

Disposed in the path of the energy radiated from the mouth of the reflector 30 are the plural conductive plates 33, which may be fabricated from thin sheet brass or any other suitable electrically-conductive material. In accordance with the principles hereinbefore discussed, each of these plates is shaped to define a portion of the surface of a right helicoid whose axis coincides substantially with the axis 32 of the virtual source of the radiation, and whose pitch is such that the maximum slope at any point on the inner edges of the plates, measured with reference to a plane passing through said point and normal to the axis 32, is substantially forty-five degrees. This is clearly illustrated, for example at 34, where 35 is a plane perpendicular to the axis 32 which intersects the plate 33a in broken line 36. 37 is a vector drawn from the point of origin 38, at the intersection of the helical inner edge of plate 33a and plane 35, and tangent to said edge. The direction of the vector 39 coincides with that of the orthogonal projection of vector 37 on plane 35. The angle $a$ formed between vectors 37 and 39 is therefore a measure of the maximum slope of the helicoidal surface of plate 33a at that point, with reference to plane 35, and, if circular polarization is to result, should have a value of substantially 45°. It is to be understood that this condition should exist regardless of where, on the inner edge of any of the plates 33, the point 38 may be located.

Now it will be apparent that the vector 39 may also be regarded as representing the electric vector, at the point 38, of one of the waves propagated from the mouth of the reflector 30, which vector, as already mentioned, is polarized in a plane perpendicular to the virtual axis of the source. Further it will be apparent that this vector is resolvable into equal-magnitude components 37 and 40, each forming an angle of 45° with the vector. One of these components, as already noted, will be parallel to the surface of the helicoidal plate, while the other apparently will be normal to the surface of the plate. Apparently the same conditions will exist, at all points on a cylindrical surface including the inner edges of plates 33, for the electric vectors of all waves emitted from the virtual source corresponding to axis 32 and polarized in planes either perpendicular to said axis or including the same. Furthermore, as already discussed with reference to Fig. 2, as the waves progress outward between the helicoidal plates, there will be a gradual shifting of the polarization of each of the components, as a result of which they will tend to remain respectively parallel and normal to the surfaces of the plates at every point in the course of their progress outward. This is illustrated, for example, by the vectors 37a and 40a originating at the point 38a on the outer edge of plate 33a and representing the electric vectors of the component waves corresponding to the component electric vectors 37 and 40 of the wave at point 38. It may be noted, incidentally, that the component waves which correspond respectively to the vectors 37a and 40a will not arrive at the point 38a simultaneously owing to the effect of the plates in increasing the phase velocity of the component whose electric vector is parallel to the surfaces of the plates. Hence the components 37a and 40a are not to be regarded as the components of the resultant electric vector at point 38a of the composite wave at the time of its arrival at the outer edges of the plates 33. Thus one of the requirements is met for the conversion of the plane polarized cylindrical waves emitted from the mouth of reflector 30 into circularly polarized cylindrical waves, as discussed with reference to Fig. 2.

As hereinbefore indicated, certain other requirements must also be satisfied with respect to the spacing of the plates and their widths in the direction of propagation of the waves, and these will now be discussed. In general, the spacing between adjacent plates in a direction normal to each of them should be selected to be between certain maximum and minimum limits. This dimension is indicated, for example, at $s$ in Fig. 3, and it will be noted that, at the inner edge of the plates, it is equal to $$\frac{1}{\sqrt{2}} \text{ times } a$$

where $a$ is the constant spacing between the plates measured along a line parallel to the axis 32 of the line source. It will, of course, be understood that the spacing of the plates in a direction normal to each of them, as denoted by the reference character $s$, is not constant but varies inversely with the radial distance from the axis 32 of the virtual source of radiation, being smallest at the inner edge of the plates and largest at the outer edge. To permit satisfactory propagation, between the plates, of waves whose length in free space is $\lambda_0$, the spacing $s$ should be at least equal to, and preferably substantially greater than $\lambda_0/2$. This expression therefore sets the lower limit of the plate spacing. On the other hand, it is possible, by judicious selection of the magnitude of the spacing, to restrict the possible modes of propagation of waves between the plates. Since the feed waveguide 31 is usually designed for the optimum propagation of wave energy in a particular mode, such restrictions may be desirable to insure that the antenna structure shall operate with maximum efficiency as a receiver of reflections of the transmitted energy. For example, in order to restrict propagation between the plates to the $TE_{0,1}$ mode, the minimum value of spacing $s$ between the plates should be made equal to or less than $\lambda_0$, which thereupon becomes the upper limit of the minimum spacing between the plates. In the practical embodiment hereinbefore mentioned, which was of the form shown in Fig. 3 and which was constructed for operation at 9375 megacycles, the minimum value of the dimension $s$ was approximately 2.2 cm. This apparently satisfies the conditions above specified, since, for the frequency in question, $\lambda_0=3.2$ cm. and $\lambda_0/2=1.6$ cm.

Because the waves emanating from the mouth of reflector 30 define cylindrical wavefronts, it is obvious that the inner and outer edges respectively, of the plates 33, should lie on the surfaces of concentric cylinders of different radii $r_1$ and $r_2$ whose axes coincide with the virtual source axis 32. If conversion from plane to circular polarization is to be effected, these radii must be so chosen, in relation to the spacing between the plates, that the component electric vector which is parallel to the surfaces of the plates will undergo a phase shift which is ninety degrees less than that to which it would be subjected in traversing the same distance in free space. Expressed mathematically this condition is:

$$\beta_0(r_2-r_1) - \int_{r_1}^{r_2} \beta_g dr = \frac{\pi}{2}$$

where $$\beta_0 = \frac{2\pi}{\lambda_0} =$$

the phase shift constant for free space, and $$\beta_g = \beta_0 \sqrt{1 - \frac{\lambda_0^2}{4a^2} - \frac{\lambda_0^2}{4a^2 r^2}} =$$

the phase shift constant for waves passing between the plates whose electric vectors are parallel to the plates, and where $\lambda_0$ is the wavelength in free space of the electromagnetic energy. Obviously these expressions may be combined to yield:

$$\frac{\lambda_0(r_2-r_1)}{4} = \int_{r_1}^{r_2} \sqrt{1 - \frac{\lambda_0^2}{4a^2 r^2} - \frac{\lambda_0^2}{4a^2 r^2}} dr$$

It may be noted that the above equation for $\beta_g$ is expressed in terms of $r$, thereby taking into account the variation of $\beta_g$ with increasing plate spacing as the radius $r$ varies. It is apparent from these expressions that either of the two radii, $r_1$ and $r_2$, may be selected with a view primarily to mechanical convenience, and that the magnitude of the other will then be dependent in part on the value of the first. Thus, in the practical embodiment constructed, $r_1$ was chosen to be approximately 1 inch=2.54 cm. This gave a value of 1.96 inches=4.98 cm. for $r_2$.

In the embodiment according to Fig. 3 the plates 33 are supported by having their ends inserted in kerfs in two strips 41 and 42 of polystyrene or other suitable dielectric material. With an exception presently to be mentioned, the kerfs are spaced at intervals equal to the dimension $a$, hereinbefore mentioned, and the strips 41 and 42 are secured by bolts or other suitable fasteners to angles 43, which, in turn, are soldered to the upper and lower parallel plates of the reflector 30. The kerfs in the upper and lower strips are suitably staggered to accommodate the pitch of the plates. It may be found necessary, as it was in the embodiment constructed, to increase somewhat the spacing between two adjacent plates in the central portion of the array to accommodate the feed waveguide 31.

It may be noted, incidentally, that the plates 33 do not all conform to portions of the surface of the same helicoid. Rather they conform to portions of the surfaces of different helicoids, each having the same pitch but being differently displaced along a common axis.

While, in the embodiment illustrated and described, the spaces between plates are occupied only by air, it will be apparent that any other suitable dielectric may be employed. This, of course, may modify the required spacing and/or width of the plates, depending on the dielectric constant of the material used for the purpose. However, the procedures for calculating the effects of such materials are so well known as not to require further discussion here. It will be noted, in particular, that a solid dielectric may be employed to advantage, in which case the dielectric will serve the additional function of shielding the rest of the structure from the weather.

The embodiment of the invention described and illustrated has been discussed with particular reference to its use to provide cylindrical waves which are substantially circularly polarized. However, it will be apparent, from the foregoing discussion with reference to Fig. 2, that the various parameters of the structure may be modified or altered, in the manner fully set forth, to provide almost any desired kind of elliptical polarization.

While the foregoing description has emphasized the use of the structure according to the invention as a radiator of electromagnetic wave energy—this being convenient for purposes of explanation—it will, of course, be understood that the operation of the structure is fully reversible, and that it likewise functions to convert incoming circularly or elliptically polarized waves to plane polarized waves. Thus it provides a selective receiving device for circularly or elliptically polarized waves, which discriminates against plane polarized waves.

The invention has been described with reference to a single preferred embodiment, but its principles have been set forth in sufficient detail to enable those skilled in the art to design and construct other useful embodiments embodying these principles and adapted for other particular applications.

I claim:

1. In combination, an electromagnetic wave radiator constructed and arranged to radiate substantially plane polarized cylindrical waves, said radiator being constructed and arranged for optimum operation with waves of a predetermined wavelength, and a structure for modifying the polarization of said waves, said structure being disposed with reference to said radiator so as to be interposed in the path of said radiated waves and comprising a plurality of spaced conductive plates, said plates being shaped to define portions of substantially right-helicoidal surfaces having axes which coincide substantially with the axis of the virtual source of said radiated waves, the spacing between adjacent plates of said polarization-modifying structure, measured in a direction normal to said plates, being at least equal to one-half said predetermined wavelength.

2. A combination according to claim 1 characterized in that the spacing of said plates is substantially uniform.

3. In combination, an electromagnetic wave radiator constructed and arranged to radiate substantially plane polarized cylindrical waves, said radiator being constructed and arranged for optimum operation with waves of a predetermined wavelength, and a structure for modifying the polarization of said waves, said structure being disposed with reference to said radiator so as to be interposed in the path of said radiated waves and comprising a plurality of spaced conductive plates, said plates being shaped to define portions of substantially right-helicoidal surfaces having axes which coincide substantially with the axis of the virtual source of said radiated waves and said plates being spaced so that the minimum spacing between adjacent plates, measured in a direction normal to said plates, does not exceed said predetermined wavelength.

4. In combination, an electromagnetic wave radiator constructed and arranged to radiate substantially plane polarized cylindrical waves, and a structure for modifying the polarization of said waves, said structure being disposed with respect to said radiator so as to be interposed in the path of said radiated waves and comprising a plurality of spaced conductive plates, said plates being shaped to define portions of substantially right-helicoidal surfaces having axes which coincide substantially with the axis of the virtual source of said radiated waves, said portions having inner and outer boundaries respectively defining a pair of concentric cylindrical surfaces of different diameters whose axes coincide substantially with the axis of said virtual source, the spacing between adjacent plates of said polarization modifying structure, measured in a direction parallel to said axes, and the radii of said cylinders being related substantially in accordance with the expression:

$$\frac{\lambda_0(r_2-r_1)}{4} = \int_{r_1}^{r_2} \sqrt{1-\frac{\lambda_0^2}{4a^2}-\frac{\lambda_0^2}{4a^2r^2}}\,dr$$

in which $\lambda_0$ is the wavelength of wave energy for which the operation of said radiator is optimum, $r_1$ and $r_2$ are the radii of said cylinders respectively, and $a$ is the spacing between adjacent plates of said polarization-modifying structure, measured in a direction parallel to said axes.

5. In combination, an electromagnetic wave radiator constructed and arranged to radiate substantially plane polarized cylindrical waves, said radiator comprising a pill box reflector and a waveguide for supplying energy to said reflector, said waveguide terminating at a point in the vicinity of the focus of said reflector, and a structure for modifying the polarization of said waves, said structure being disposed with reference to said radiator so as to be interposed in the path of said radiated waves and comprising a plurality of spaced conductive plates, said plates being shaped to define portions of a substantially right-helicoidal surface having axes which coincide substantially with the axis of the virtual source of said radiated waves.

6. A combination according to claim 5 in which portions of said plates of said polarization-modifying structure are inserted in kerfs or slits in strips of dielectric material affixed to said pillbox reflector, whereby said plates are supported in fixed relationship to said radiator.

7. A combination according to claim 1 characterized in that the portions of right-helicoidal surfaces defined by said conductive plates have inner and outer boundaries, respectively defining a pair of concentric cylindrical surfaces of different diameters whose axes coincide substantially with the axis of said virtual source.

8. A combination according to claim 7 characterized in that the pitch of said helicoidal surfaces is such that, at any point coinciding with an edge of said plates defined by the cylinder of smaller diameter, the maximum slope of said surfaces, measured with reference to a plane passing through said point and normal to the axis of said virtual source, is substantially forty-five degrees.

9. A combination according to claim 1 characterized in that the pitch of said helicoidal surfaces is such that, for at least some position of the wavefronts of waves radiated by said radiator and at any point on the line of intersection of said wavefronts with said surfaces, the maximum slope of said surfaces, measured with reference to the planes of polarization of said waves, is substantially forty-five degrees.

HERMAN A. AFFEL, Jr.
RICHARD A. DIBOS.

References Cited in the file of this patent

UNITED STATES PATENTS

| Number | Name | Date |
|---|---|---|
| 2,407,318 | Mieher et al. | Sept. 10, 1946 |
| 2,464,269 | Smith | Mar. 15, 1949 |
| 2,473,613 | Smith | June 21, 1949 |

FOREIGN PATENTS

| Number | Country | Date |
|---|---|---|
| 668,231 | Germany | Nov. 28, 1938 |

Certificate of Correction

Patent No. 2,637,847                                                May 5, 1953

Herman A. Affel, Jr., et al.

It is hereby certified that error appears in the printed specification of the above numbered patent requiring correction as follows:

Column 8, line 49, for "as" read *at*; line 55, for "usually" read *unusually*; column 12, lines 43 to 45, for that portion of the formula reading $$-\int_{r_1}^{r_1} \beta_x dr = \quad \text{read} \quad -\int_{r_i}^{r_1} \beta_x dr =$$

lines 60 to 62, for that portion of the equation reading $$-\frac{\lambda_0^2}{4a^2r^2}- \quad \text{read} \quad -\frac{\lambda_0^2}{4a^2}-$$

and that the said Letters Patent should be read as corrected above, so that the same may conform to the record of the case in the Patent Office.

Signed and sealed this 23rd day of February, A. D. 1954.

[SEAL]

ARTHUR W. CROCKER,
*Assistant Commissioner of Patents.*